UNITED STATES PATENT OFFICE.

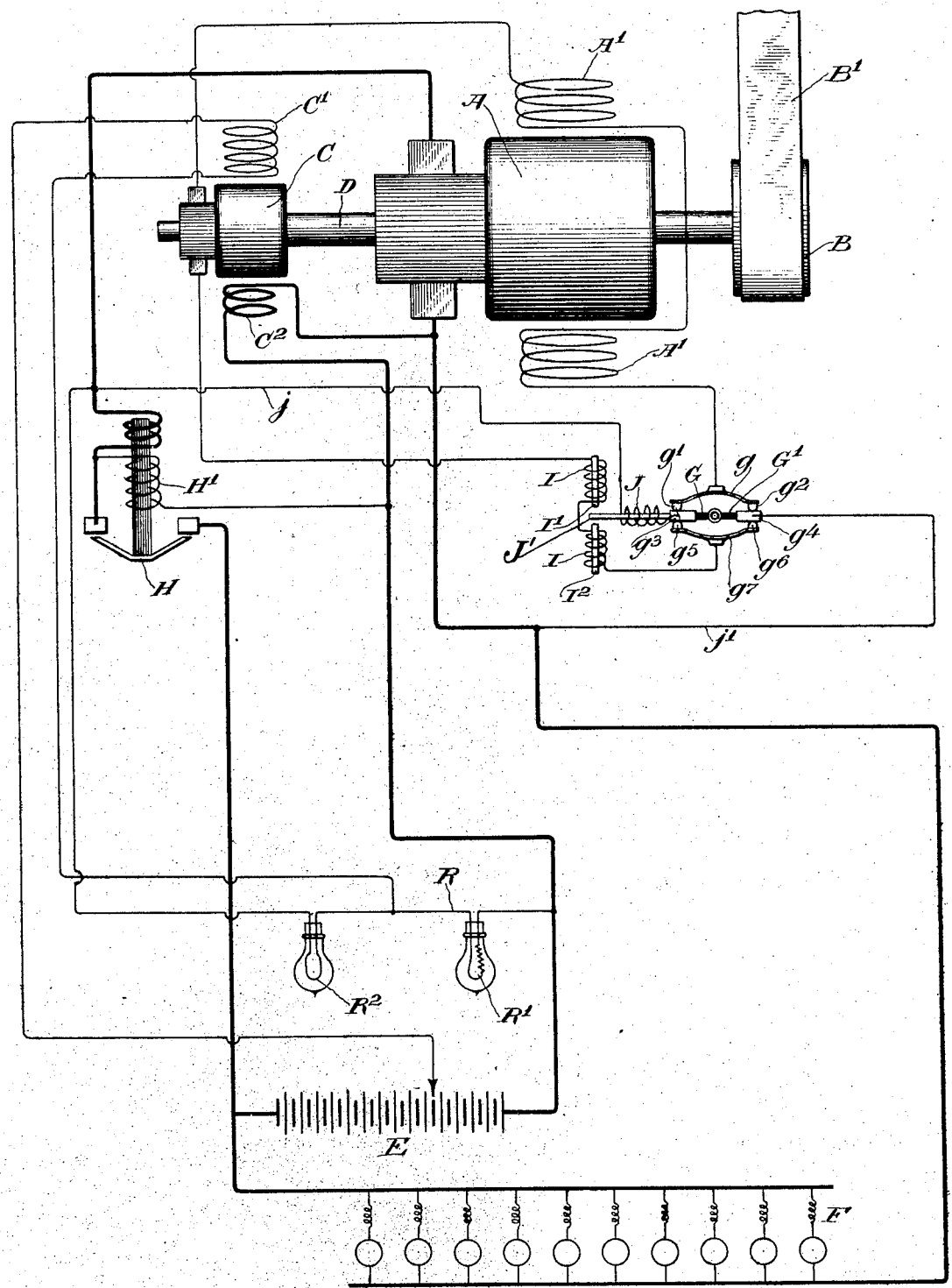

WILLIAM A. TURBAYNE, OF LANCASTER, NEW YORK, ASSIGNOR, BY MESNE ASSIGNMENTS, TO GOULD COUPLER COMPANY, A CORPORATION OF NEW YORK.

ELECTRICAL SYSTEM OF DISTRIBUTION.

991,105.  Specification of Letters Patent.  Patented May 2, 1911.

Application filed February 8, 1908. Serial No. 414,889.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to means for regulating the charging current of batteries in such systems where the charging dynamo supplies other translating devices.

My invention is particularly adapted to the regulation of the dynamo employed in car lighting systems.

It is found that the charging of batteries is much more satisfactorily accomplished if the charging current is allowed to fall off as the battery to a predetermined extent becomes more fully charged.

My invention comprehends various features for accomplishing this object. These features include an auxiliary generator for opposing the action of the main generator of a system under normal working conditions, a field on said auxiliary generator, the strength of which is adapted to vary in accordance with changes in condition of charge of the battery, and resistances connected in such a way as to cause the voltage at the terminals of the field of the auxiliary generator to vary as the charge of the battery varies.

My invention also includes more specific features relating to the combination and arrangement of such a system of distribution, as will appear from the following description.

The drawing is a diagram of my invention as applied to an axle lighting system.

A indicates the main dynamo and A' the field winding thereof. The dynamo is indicated as being driven by a pulley B and belt B' from any suitable source of power, as, for example, the axle of a railway car.

C is an auxiliary or regulating dynamo which is mechanically connected to the main dynamo by the shaft D and, therefore, rotates in the same direction as the main dynamo.

C' and $C^2$ are field windings of the auxiliary dynamo or generator.

E is a storage battery and F a work circuit which, in the present instance, consists of a number of lamps with a regulating resistance in the circuit of each.

G is a switch that controls the connection of the field winding A' of the main dynamo. The various portions of the system are shown in the positions they occupy when the system is about to be started up. The switch "H" is open and the work circuit is being fed from the battery. The coil C' of the auxiliary generator is energized from the battery, the terminals of the coil being connected at points of different potentials, one in the battery and the other at a point in the branch circuit R. At this time also the auxiliary generator C is connected in a local circuit with the field winding A' of the main dynamo, the circuit being from the upper brush of the auxiliary generator, through the field winding A', thence through the spring $g$ to contacts $g'$ and $g^2$, carried thereby, thence through the contacts $g^3$ and $g^4$ of the pivoted member G' to the contacts $g^5$ and $g^6$ carried on the spring $g^7$, thence through coil I to the lower brush of the auxiliary generator. Thus when the machines are started the auxiliary generator will excite the main generator, and since both generators rotate in the same direction the positive terminal of the main generator will always be on the same side.

Upon development of an electromotive force by the main dynamo a current is developed in the local circuit which includes the conductor $j$, coil J, contacts $g^3$, $g'$, and $g^5$, springs $g$ and $g^7$, contacts $g^2$, $g^6$ and $g^4$ and conductors $j'$. This current energizes a magnetizable member J', extending from the pivoted switch member G'. The arm J' will be attracted upwardly or downwardly by the magnetizable members I' or $I^2$ according to the direction of the current from the auxiliary dynamo. If the arm J' moves upward then the contact arm G' will swing so that the contact is broken between $g^3$ and $g^5$ and between $g^2$ and $g^4$, whereas if it is attracted downward the contact arm G' will break contact between $g'$ and $g^3$ and between $g^4$ and $g^6$. These connections throw the field A' in circuit with the main generator A and cause the field A' to be very rapidly built up.

When the electromotive force of the main generator has reached its normal value, the switch H is closed by the action of the coil H'. This throws the work circuit and battery in series with the main generator and a heavy current passes through the coil $C^2$. Enough current will pass through coil $C^2$ during the normal operation of the system to cause the coil $C^2$ to overcome the opposing magnetizing forces of the coil C' and, therefore, reverse the polarity of the auxiliary generator and cause it to become a counter machine to oppose electromotive force of the main dynamo. As the current varies in this coil the counter-electromotive force of the auxiliary generator will vary and the electromotive force of the main dynamo will vary, the arrangement being such that as the current in coil $C^2$ increases the electromotive force of the main dynamo will decrease and vice versa, thus regulating the main dynamo to give a substantially constant current through the coil $C^2$.

Nearly all of the features so far described are not novel with this application, but have been carefully shown, described and claimed by me in Patent No. 954,599, granted April 12, 1910, for electrical system of distribution. The tendency in such a system is, as has already been pointed out, to keep the current in coil $C^2$ constant and, therefore, to keep the battery charging current constant, but, it has been found advantageous to have this charging current decrease as the charging progresses. To accomplish this I provide the resistances R' and $R^2$ in a circuit R parallel with the battery. One of these resistances $R^2$ remains practically constant for different temperatures and when different currents are passing through it, or, if not exactly constant it is preferred that it shall have a negative coefficient. An ordinary incandescent lamp has been found well suited for these purposes. The other resistance R' is such, that, through a certain range of temperature its resistance varies greatly, thus when the current passing through this resistance is increased the value of the resistance increases rapidly. Iron wire is found to possess these qualities through a certain range of temperature and is well adapted for the purposes in question.

As before pointed out the coil C' is connected to any convenient point in the battery, and to a point in the circuit R between the resistances R' and $R^2$. When the machines are about to be started up the resistance R' is at its smallest value, and the coil C' is connected to the battery at such a point that there is a difference of potential between the terminals of the coil C' and a current is caused to flow therethrough. This current forms the initial excitation for the auxiliary generator.

When the system is working under normal conditions the coil C' opposes the coil $C^2$ and tends to cut down the excitation of the auxiliary generator. Since the auxiliary generator is, under these conditions, a counter machine, an increase in the field strength of coil C' tends to increase the effective voltage of the main generator. Likewise if the field strength of coil C', is decreased the counter effect of the auxiliary generator is increased and the effective voltage of the main generator is decreased causing a decrease in the value of the charging current.

As the charging of the battery progresses its opposition to the charging current increases. This is due to the increase in voltage, increase in resistance, etc. This will cause the voltage of the main generator to rise in accordance with the principles described in my previous application mentioned above, and will, therefore, cause an increase of current in the circuit R and the resistances R' and $R^2$. This increase of current in the resistance R' increases the temperature thereof, and accordingly greatly increases the value of its resistance. This decreases the difference of potential between the terminals of the coil C', in accordance with the principles of the well known "Wheatstone bridge" and consequently the excitation caused by the coil C' is decreased and the charging current decreased, as above described. Thus as the charging progresses the opposition set up by the battery increases, the current in circuit R and resistances R' and $R^2$ increases, the current in coil C' decreases and it may finally reverse so that the field C' will aid the field $C^2$. These considerations cause the difference between the effective voltage of the main generator and the battery voltage to decrease and the charging current is gradually decreased, thus giving the desired "taper" charge to the battery.

Although I have shown my novel features as applied to axle lighting systems of electrical distribution, I do not limit myself to such application. My novel arrangement is adapted to any charging system where a regulating coil may be used to vary the value of the charging current.

I claim—

1. The combination of a main generator, a circuit connected thereto, a battery connected to be charged from said circuit, means for regulating the generator, and means connected to the battery terminals and to a point within the battery for regulating said first mentioned means to cause the current in said circuit to vary to give the battery a tapering charging current responsive to variations in the electrical condition of the battery.

2. The combination of a main generator, a circuit connected thereto, a battery connected to said circuit, an auxiliary generator for regulating the main generator and means connected to a point within the battery for regulating said auxiliary generator to vary the current in said circuit responsive to changes in the electrical condition of the battery.

3. The combination of a main generator, a circuit connected thereto, a battery connected to said circuit, an auxiliary generator for regulating the main generator, and a coil connected to a point within the battery for regulating said auxiliary generator to vary the current in said circuit responsive to variations in the electrical condition of the battery.

4. The combination of a variable speed generator, a battery connected to be charged thereby, means for regulating the voltage of the generator, a resistance markedly variable with changes of current therein and connected so that its value will vary materially as the battery voltage rises, and means responsive to changes in the value of said resistance for regulating said first mentioned means to give the battery a tapering charge.

5. The combination of a source of electromotive force, a circuit connected thereto, a storage apparatus in operative relation to said circuit, a resistance markedly variable with changes of current therein, connected so that the current therein is responsive to variations in the electrical condition of the apparatus, and means responsive to variations in the electrical condition of said resistance and acting to cause material variations in the current in said circuit responsive to changes in the electrical condition of the storage apparatus to give the battery a material tapering charge.

6. The combination of a generator, a supply circuit connected thereto, an auxiliary dynamo for regulating the generator, a battery in operative relation to said circuit, a resistance markedly variable with changes of current therein, connected to be responsive to voltage variations of the battery and a coil controlled by said resistance for varying the regulating action of the auxiliary dynamo responsive to changes in the electrical condition of the battery to give the battery a tapering charge.

7. The combination of a generator, a circuit connected thereto, an auxiliary dynamo for regulating the generator, a battery in operative relation thereto, a resistance markedly variable with changes of current therein, connected so that the current therein is responsive to variations in the electrical condition of the battery and a coil connected to said battery and said resistance and arranged to vary the voltage of the auxiliary dynamo responsive to changes in the electrical condition of said resistance to cause the battery to be given a tapering charge.

8. The combination of a main generator, a circuit connected thereto, an auxiliary generator for regulating the main generator, a battery connected to said circuit, a plurality of resistances connected to said circuit, one of said resistances markedly varying in value with certain changes in temperature and means connected to said resistances for regulating the auxiliary generator responsive to changes in the electrical condition of the battery.

9. The combination of a main generator, a circuit connected thereto, an auxiliary generator for regulating the main generator, a battery connected to said circuit, a plurality of resistances connected in series to said circuit, one of said resistances being of iron and means connected to said resistances for regulating the auxiliary generator responsive to changes in the electrical condition of the battery.

10. The combination of a main generator, a circuit connected thereto, an auxiliary generator for regulating the main generator, a battery connected to said circuit, a plurality of resistances connected to said circuit, one of said resistances markedly varying in value with certain changes in temperature, and a coil connected to said resistances and to a point in the battery and forming a "Wheatstone bridge" arrangement of circuits, said coil regulating the auxiliary generator responsive to changes in the electrical condition of the battery.

11. The combination of a main generator, a circuit connected thereto, an auxiliary generator for regulating the main generator, a battery connected to said circuit, a resistance of iron connected to said circuit and a coil connected to said resistance and to the battery for regulating said auxiliary generator responsive to changes in the electrical condition of the battery.

12. The combination of a main generator, a circuit connected thereto, an auxiliary generator for regulating the main generator, means for regulating said auxiliary generator tending to keep the current constant in said circuit, and means for regulating said auxiliary generator to vary the current in said circuit to give the battery a tapering charge responsive to changes in the electrical condition of the system.

13. The combination of a main generator, a circuit connected thereto, an auxiliary generator for regulating the main generator, means for regulating said auxiliary generator tending to keep the current constant in said circuit, and a field coil for regulating said auxiliary generator to gradually decrease the current in said circuit responsive to changes in the electrical condition of the battery to give the battery a material tapering charge.

14. The combination of a main generator, a circuit connected thereto, an auxiliary generator for regulating the main generator, means for regulating said auxiliary generator tending to keep the current constant in said circuit, a plurality of resistances connected to said circuit, one of said resistances markedly varying in value with certain changes in temperature and means connected to said resistances acting to cause variations in the current in said circuit responsive to changes in the electrical condition of the battery.

15. The combination of a main generator, a circuit connected thereto, an auxiliary generator for regulating the main generator, means for regulating said auxiliary generator tending to keep the current constant in said circuit, a plurality of resistances connected to said circuit, one of said resistances markedly varying in value with certain changes in temperature, and a coil connected to said resistances and to the battery for regulating said auxiliary generator responsive to changes in the electrical condition of the battery.

16. The combination of a main generator, a circuit connected thereto, an auxiliary generator for regulating said main generator, a field coil for said auxiliary generator tending to keep the current in said circuit at a constant value, and a field coil for said auxiliary generator for gradually decreasing said current responsive to changes in the electrical condition of the battery.

17. The combination of a main generator, a circuit connected thereto, an auxiliary generator for regulating said main generator, a field coil for said auxiliary generator tending to keep the current in said circuit at a constant value, and a field coil for gradually decreasing the current in said circuit responsive to variations in the electrical condition of the battery.

18. The combination of a main generator, a circuit connected thereto, an auxiliary generator for regulating said main generator, a field coil for said auxiliary generator tending to keep the current in said circuit at a constant value, a resistance markedly variable with changes of current therein, connected to have the current therein responsive to changes in the electrical condition of the battery and a coil connected to be responsive to variations in the electrical condition of the battery and said resistance for regulating said auxiliary generator.

19. The combination of a main generator, a circuit connected thereto, an auxiliary generator for regulating said main generator, a field coil for said auxiliary generator tending to keep the current in said circuit at a constant value, a plurality of resistances connected to said circuit, one of said resistances markedly varying in value with certain changes in temperature and a coil connected to said resistances for regulating the auxiliary generator to vary the current in said circuit responsive to changes in the electrical condition of the battery.

20. The combination of a main generator, a circuit connected thereto, an auxiliary generator for regulating said main generator, a field coil for said auxiliary generator tending to keep the current in said circuit at a constant value, a plurality of resistances connected to said circuit, one of said resistances markedly varying in value with certain changes in temperature, and a field coil connected to said resistances and to the battery for regulating the auxiliary generator to vary the current in said circuit responsive to changes in the electrical condition of the battery.

21. The combination of a main generator, a circuit connected thereto, an auxiliary generator for regulating said main generator, a field coil for said auxiliary generator tending to keep the current in said circuit at a constant value, a plurality of resistances connected to said circuit, one of said resistances markedly varying in value with certain changes in temperature, and a coil opposing said first mentioned coil and connected to said resistances for regulating the auxiliary generator to vary the current in said circuit responsive to changes in the electrical condition of the battery.

22. The combination of a main generator, a circuit connected thereto, an auxiliary generator for regulating said main generator, a battery connected to said circuit, a field coil for said auxiliary generator tending to keep the current in said circuit constant and a field coil opposing said first mentioned coil and regulating said auxiliary generator to vary the current in said circuit responsive to variations in the electrical condition of the battery.

23. The combination of a main generator, a circuit connected thereto, a battery connected to said circuit, an iron resistance connected to said circuit which will vary in value to a great extent with slight changes of current therein, and means controlled by said resistance acting to cause variations in the current in said circuit responsive to variations in the electrical condition of the battery.

24. The combination of a main generator, a circuit connected thereto, a battery connected to said circuit, an iron resistance also connected to said circuit, which will vary in value to a great extent with slight changes of current therein, a regulating dynamo provided with a field coil connected in series with the battery and a field coil therefor the magnetic strength of which varies in accordance with changes in the electromotive force of the battery.

In testimony whereof, I have signed my name to this specification, in the presence of two subscribing witnesses.

WILLIAM A. TURBAYNE.

Witnesses:
ANNA DALY,
EDWIN SEGER.